United States Patent
Itagi et al.

(10) Patent No.: US 7,567,387 B2
(45) Date of Patent: Jul. 28, 2009

(54) PHASE OFFSET INTEGRATED SOLID IMMERSION MIRROR AND LENS FOR A GENERAL PHASE FRONT

(75) Inventors: Amit Vasant Itagi, Pittsburgh, PA (US); Tuviah Ehud Schlesinger, Pittsburgh, PA (US)

(73) Assignee: Seagate Technology LLC, Scotts Valley, CA (US)

(*) Notice: Subject to any disclaimer, the term of this patent is extended or adjusted under 35 U.S.C. 154(b) by 784 days.

(21) Appl. No.: 10/962,775

(22) Filed: Oct. 12, 2004

(65) Prior Publication Data

US 2006/0077787 A1 Apr. 13, 2006

(51) Int. Cl.
*G02B 3/00* (2006.01)
(52) U.S. Cl. .................. 359/662; 359/726; 359/839
(58) Field of Classification Search .................. 359/662, 359/656, 726–728, 839
See application file for complete search history.

(56) References Cited

U.S. PATENT DOCUMENTS

| | | | |
|---|---|---|---|
| 4,979,788 A | | 12/1990 | Brazas, Jr. |
| 5,199,090 A | * | 3/1993 | Bell ............................. 385/33 |
| 5,912,765 A | * | 6/1999 | Crane et al. .................. 359/385 |
| 6,185,051 B1 | * | 2/2001 | Chen et al. ................... 359/709 |
| 6,307,996 B1 | | 10/2001 | Nashimoto et al. |
| 6,594,430 B1 | * | 7/2003 | Rausch et al. ................ 385/129 |
| 2002/0114567 A1 | * | 8/2002 | Novotny et al. ............... 385/33 |
| 2003/0128633 A1 | | 7/2003 | Batra et al. |
| 2003/0128634 A1 | | 7/2003 | Challener |
| 2003/0137772 A1 | | 7/2003 | Challener |
| 2003/0184903 A1 | | 10/2003 | Challener |
| 2004/0001394 A1 | * | 1/2004 | Challener et al. ........ 369/13.32 |
| 2004/0001420 A1 | | 1/2004 | Challener |
| 2004/0008591 A1 | | 1/2004 | Johns et al. |
| 2004/0062503 A1 | | 4/2004 | Challener |

OTHER PUBLICATIONS

G. A. Deschamps, "Ray Techniques in Electromagnetics," *Proceedings of the IEEE*, vol. 60, Sep. 1972, pp. 1022-1035.
S. M. Mansfield et al., "Solid Immersion Microscope," *Appl. Phys. Lett.*, vol. 57, No. 24, Dec. 10, 1990, pp. 2615-2616.
K. E. Spaulding et al., "Achromatic Mode-Index/Diffractive Waveguide Lens," *Journal of Lightwave Technology*, vol. 10, No. 12, Dec. 1992, pp. 1855-1859.

(Continued)

*Primary Examiner*—Jordan M. Schwartz
*Assistant Examiner*—James R Greece
(74) *Attorney, Agent, or Firm*—Robert P. Lenart, Esq.; Pietragallo Gordon Alfano Bosick & Raspanti, LLP

(57) ABSTRACT

An apparatus comprises a condenser for directing electromagnetic radiation to a focal point, the condenser comprising a first interface on a first side of a longitudinal axis for directing a first plurality of rays of the electromagnetic radiation to a focal point and a second interface on a second side of the longitudinal axis for directing a second plurality of rays of the electromagnetic radiation to the focal point, wherein the first and second interfaces are shaped such that at the focal point, the second plurality of rays are about 180° out of phase with respect to the first plurality of rays.

5 Claims, 3 Drawing Sheets

OTHER PUBLICATIONS

M. Born et al., "Principles of Optics," *Cambridge University Press*, Cambridge, 7th Ed., 1999, pp. 136-139.

T. Rausch et al., "Near Field Hybrid Recording With a Mode Index Waveguide Lens," *Proceedings of SPIE*, Int. Soc. Opt. Eng. (USA), vol. 4090, 2000, pp. 67-71.

J. J. M. Ruigrok et al., "Disk Recording Beyond 100 Gb/in.$^2$: Hybrid Recording?" (invited), *Journal of Applied Physics*, vol. 87, No. 9, May 1, 2000, pp. 5398-5403.

T. E. Schlesinger et al., "An Integrated Read/Write Head for Hybrid Recording," *Jpn. J. Appl. Phys.*, vol. 41, Part 1, No. 3B, 2002, pp. 1821-1824.

W. A. Challener et al., "Light Delivery Techniques for Heat-Assisted Magnetic Recording," *Jpn. J. Appl. Phys.*, vol. 42, Part 1, Feb. 2003, pp. 981-988.

A. V. Itagi et al., "Refraction Theory for Planar Waveguides: Modeling of a Mode Index Integrated Solid Immersion Lens," *Jpn. J. Appl. Phys.*, Part 1, No. 2B, vol. 42, Feb. 2003, pp. 740-749.

* cited by examiner

PHASE OFFSET INTEGRATED SOLID IMMERSION MIRROR AND LENS FOR A GENERAL PHASE FRONT

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to transducers for concentrating electromagnetic energy, and more particularly to such transducers for use in heat assisted magnetic recording.

BACKGROUND OF THE INVENTION

One of the fundamental objectives of optical data storage research has been the generation of small and intense optical spots. This objective has become even more pertinent to the magnetic data storage industry with the conceptualization of a heat assisted magnetic recording system. Some devices for generating small optical spots use: a focusing device, such as a lens, that bends the optical rays toward a common point; small apertures in metal that generate evanescent fields; or a combination of the two.

Heat assisted magnetic recording (HAMR) has been proposed as a means by which the recording density of hard disc drives may be extended to 1 Tb/in$^2$ or higher. Current conventional hard disc drive technology is limited by the superparamagnetic effect, which causes the small magnetic grains needed for high density recording media to gradually lose their magnetization state over time due to thermal fluctuations. By using heat assisted magnetic recording, the magnetic anisotropy of the recording medium, i.e. its resistance to thermal demagnetization, can be greatly increased while still allowing the data to be recorded with standard recording fields. In HAMR, a laser beam heats the area on the disc that is to be recorded and temporarily reduces the anisotropy, and hence coercivity, in just that area sufficiently so that the applied recording field is able to set the magnetic state of that area. After cooling back to the ambient temperature, the anisotropy returns to its high value and stabilizes the magnetic state of the recorded mark.

HAMR systems require a device that is able to conduct sufficient light energy into the recording medium to heat it by several hundred degrees, but only in the area that is desired to be recorded, which typically will have dimensions on the order of a single bit, which is about 25 to 50 nm, if the recording density is 1 Tb/in$^2$. If the optical hot spot is larger than this area, it will extend to neighboring bits and tracks on the disc, and by heating those areas as well, the data recorded in those areas will be erased.

Most focusing systems used in optical data storage systems can be thought of as generating a converging cone of optical rays from a narrow group of parallel rays. If θ is the half angle of the cone, the numerical aperture (NA) of the optical system is given by n sin θ, where n is the refractive index of the medium in which the vertex of the cone resides. For a given optical frequency, diffraction theory predicts that the size of the focused spot is inversely proportional to the numerical aperture of the system.

This invention provides an optical transducer design that accommodates non-planar incident wavefronts and avoids the need for phase shifting a portion of the incident light.

SUMMARY OF THE INVENTION

This invention provides an apparatus comprising a condenser for directing electromagnetic radiation to a focal point, the condenser comprising a first interface on a first side of a longitudinal axis for directing a first plurality of rays of the electromagnetic radiation to a focal point and a second interface on a second side of the longitudinal axis for directing a second plurality of rays of the electromagnetic radiation to the focal point, wherein the first and second interfaces are shaped such that at the focal point, the second plurality of rays are about 180° out of phase with respect to the first plurality of rays.

In another aspect, the invention provides an apparatus comprising a condenser for directing electromagnetic radiation, having a non-planar phase front, to a focal point, wherein the condenser includes an interface shaped to direct the electromagnetic radiation to a focal point.

DETAILED DESCRIPTION OF THE INVENTION

Figure 1:
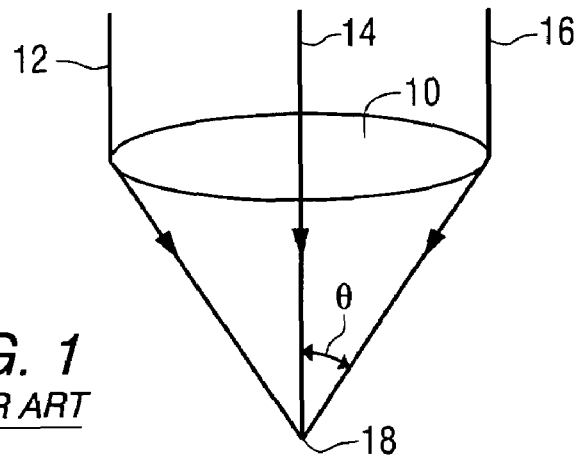
FIG. 1 is a schematic drawing showing focusing using an objective lens.

In traditional optical data storage systems, an objective lens such as lens 10 in FIG. 1 is used to focus an electromagnetic wave to a small spot on a recording medium. The electromagnetic wave, which could be for example infrared, visible, or ultraviolet light, is illustrated by arrows 12, 14 and 16, and is directed to the lens. For the purposes of this description, the term "light" is used to encompass the various types of electromagnetic waves that can be used in this invention. In the system of FIG. 1, focusing of the light is done in free space and the half angle θ of the cone of light that is directed toward the focal point 18 is a function of the lens size and the focal length.

Figure 2:
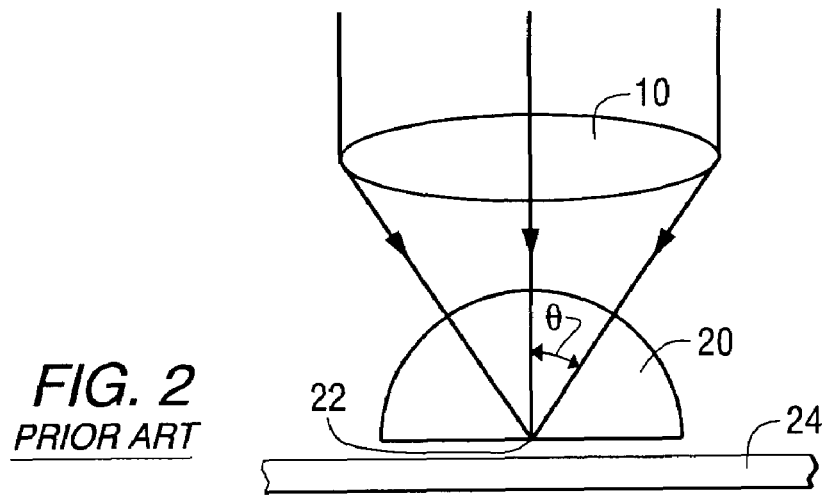
FIG. 2 is a schematic drawing of an objective lens in combination with a solid immersion lens.

The size of a spot produced by the objective lens can be reduced by using an additional hemispherical lens 20 called a solid immersion lens (SIL), as shown in FIG. 2. The focused spot is generated at the interface 22 of the lens and free space. Since the refractive index of the medium where the light gets focused is greater than that of free space, the size of the optical spot is smaller than that generated by an objective lens alone. If a storage medium 24, such as a magneto-optic disc, is placed in the near field of the lens, the spot remains confined at the lens-disc interface as a result of the evanescent coupling.

Figure 3:
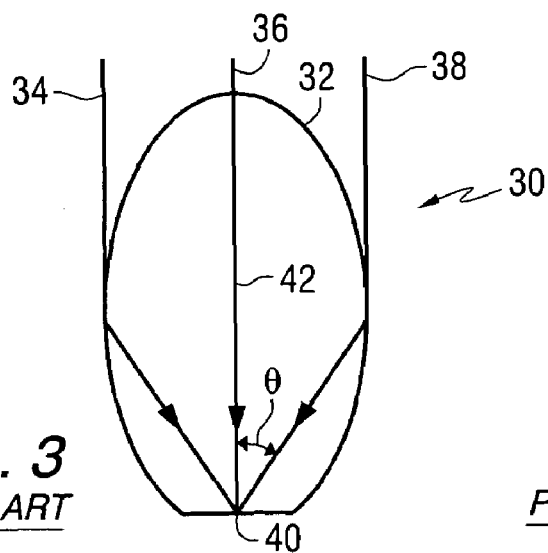
FIG. 3 is a plan view of an integrated solid immersion lens.
Figure 4:
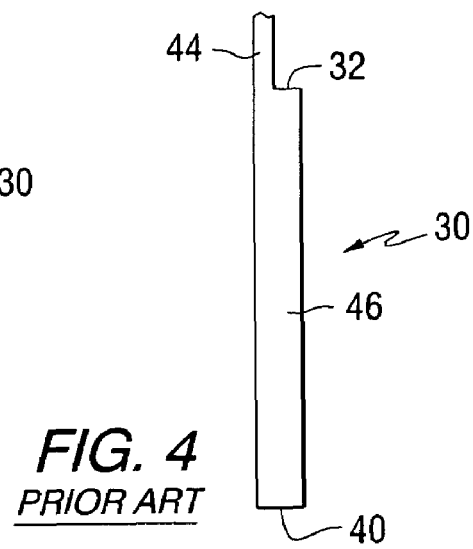
FIG. 4 is a side view of a portion of an integrated solid immersion lens.

Due to space and mass considerations, a waveguide optical transducer is more feasible for heat assisted magnetic recording than bulk optics. In the case of a planar waveguide transducer, the focusing cone becomes a focusing triangle. A waveguide analog of the SIL system is the integrated solid immersion lens (ISIL) 30 as shown in FIG. 3. The ISIL includes a lens-like interface 32. Light, illustrated by arrows 34, 36 and 38 is refracted at the interface and directed toward a focal point 40. Arrow 36 lies along a longitudinal axis 42 of the ISIL. The regions inside and outside the lens-like interface are two planar waveguides 44 and 46 with different thicknesses as shown in FIG. 4. The thicknesses are chosen such that the fundamental mode in the region outside the interface couples into the fundamental mode in the region inside the interface. The fundamental modes in the two regions have different mode indices (the analogue of bulk optics refractive indices) and the shape of the interface has to be appropriately designed to get the desired focusing to a point.

Figure 5:
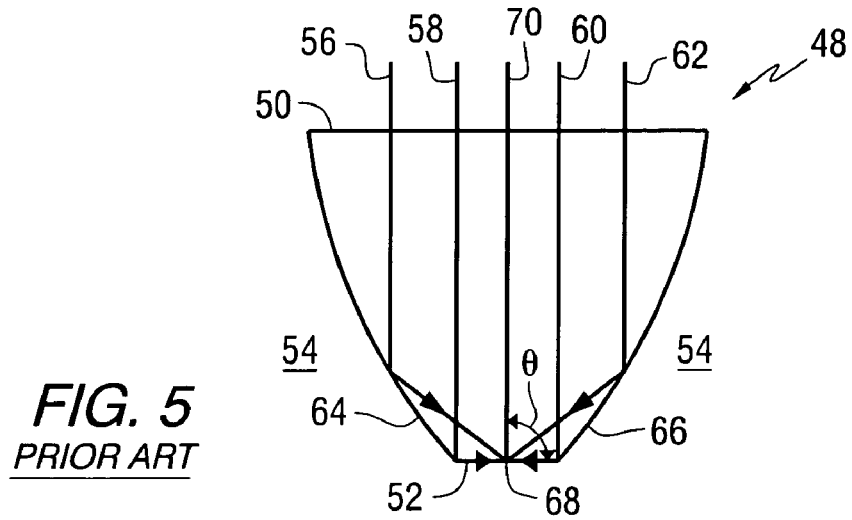
FIG. 5 is a plan view of a solid immersion mirror.

The half angle of the focusing cone for the SIL and the focusing triangle for the ISIL system cannot be very large due to geometric constraints. One way of increasing the half angle is by using an integrated solid immersion mirror (ISIM) 48 as shown in FIG. 5. In this device, a waveguide 50 is truncated at one end 52 and forms a converging mirror. The refractive indices of the waveguide 50 and the material 54 outside of the waveguide, are chosen such that light illustrated by arrows 56, 58, 60 and 62 is reflected at the interfaces 64 and 66 and directed toward a focal point 68 on an axis 70. The half angle $\theta$ can then be very close to $\pi/2$.

As used herein, the term "condenser" includes both solid immersion mirrors and integrated solid immersion lenses. Also, as used herein, the term "interface" means a surface or point corresponding to a change in the mode index (for planar devices) or the index of refraction (for three-dimensional devices) of the transducer structure. While a parabolic shape for the interfaces for both an integrated solid immersion lens and a solid immersion mirror is known for the case of a planar incident wavefront, it would be desirable to design the interface for the case of a general converging or a diverging wavefront.

While the structures of FIGS. 1-5 reduce the size of the optical spot, the longitudinal electric field (normal to the medium) component goes to zero at the center of the optical spot. Certain applications of the transducer require a strong longitudinal electric field component at the center of the optical spot. In a planar waveguide, this can be obtained if the rays from one half of the focusing triangle are 180° out of phase with respect to the rays from the other half. For example, in the ISIM of FIG. 5, an additional structure not shown in FIG. 5, could be used to phase shift the incoming rays on one side of the longitudinal axis 70 so that those rays are shifted 180° in phase with respect to the rays on the other side of the longitudinal axis. This causes an electric field component of the light to lie parallel to the longitudinal axis at the focal point. The transducers of this invention can include interfaces that produce rays with this property as well, without the need for separate phase shifting structures.

Figure 6:
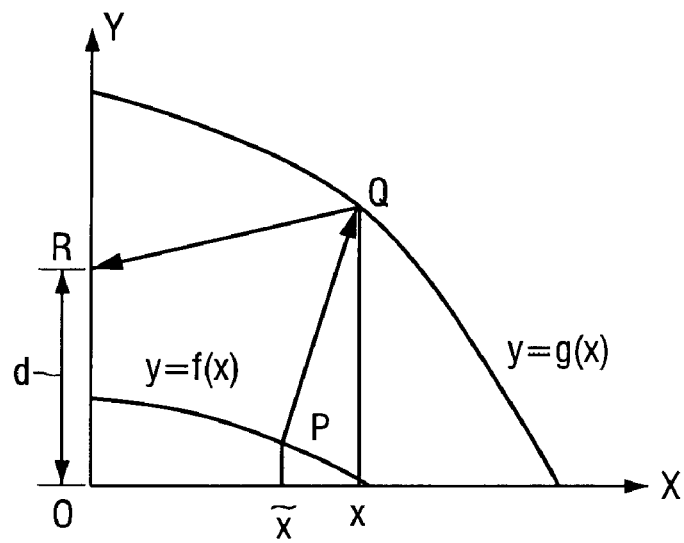
FIG. 6 is a plot showing wavefronts in a solid immersion mirror.
Figure 7:
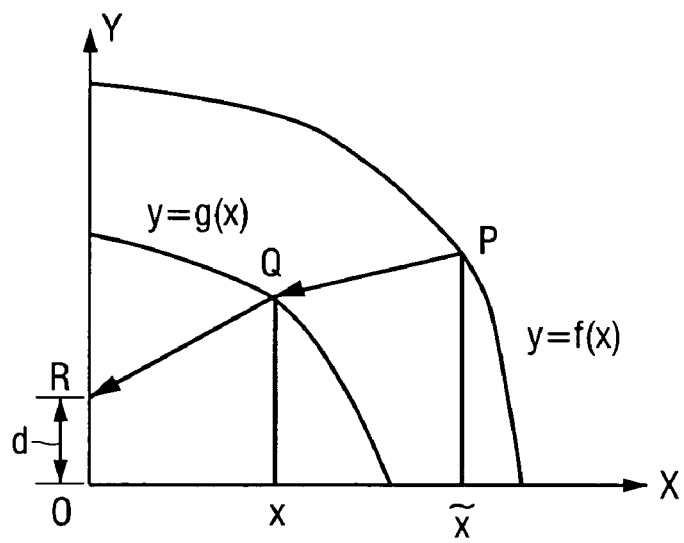
FIG. 7 is a plot showing wavefronts in an integrated solid immersion lens.

A geometric representation of a generalized wavefront and transducer interface is illustrated in FIGS. 6 and 7, for the ISIM and ISIL, respectively. FIG. 6 is a plot showing a non-planar wavefront y=f(x) in combination with an integrated solid immersion mirror having an interface y=g(x). FIG. 7 is a plot showing a non-planar wavefront y=f(x) in combination with integrated solid immersion lens having an interface y=g(x). In FIGS. 6 and 7, the Y axis would be positioned along the central axis of the transducer. Thus FIGS. 6 and 7 represent the wavefront and interface in one half of a transducer. As used herein, the term wavefront (or phase front) means a location wherein the rays of the incident light have the same phase.

In FIGS. 6 and 7, the curve f(x) represents a general form of a phase front. PQ is a ray of this phase front that is normal to the phase front (that is, perpendicular to a tangent of the phase front). To design a transducer in accordance with this invention, the form g(x) of the surface (or interface) of a solid immersion mirror (or integrated solid immersion lens), must be determined such that upon reflection (or refraction) from this surface (or interface), all the rays meet at a point R: (0,d), also called the focal point.

By Fermat's principle of extremal optical path, the optical path length of the rays from a point on the phase front to the point R is a constant a. The phase shift in the rays on reflection (or refraction) will be a function of the angle of incidence. The angle of incidence is the angle made by the ray with the surface normal. Assuming that this phase shift along the interface is small (on the scale of a wavelength), the phase factor can be lumped with the amplitude of the rays, and the geometric optics picture based purely on the optical path length is valid. The amplitude is a complex number, so the phase shift can be included as an additional multiplicative complex factor. The phase shift at every location of the interface is different. But this variation is gradual. That is, the phase shift does not jump abruptly as one goes along the interface.

For the purposes of this description, assume that the modal index of the waveguide in the ISIM is n. In the case of the ISIL, assume that the modal index of the region in which the focal point resides is $n_2$ and the modal index of the region that does not contain the focal point is $n_1$.

The constraining relations for a general phase front are shown below, and the problem is solved for specific cases. Let the position vector $\vec{r}_1$ of point P be given by:

$$\vec{r}_1 = \tilde{x}\hat{x} + f(\tilde{x})\hat{y} \tag{1}$$

where, $\hat{x}$ and $\hat{y}$ are unit vectors along the X and Y axes, respectively. The unit vector $\hat{n}$ along a ray in the phase front at this point in the case of the ISIM is given by:

$$\hat{n} = \frac{-f'(\tilde{x})\hat{x} + \hat{y}}{\sqrt{1 + [f'(\tilde{x})]^2}} \tag{2}$$

where, the prime stands for the derivative with respect to x. The corresponding unit vector for the ISIL is given by:

$$\hat{n} = \frac{f'(\tilde{x})\hat{x} - \hat{y}}{\sqrt{1 + [f'(\tilde{x})]^2}} \tag{3}$$

Let h be the distance traveled by this ray to the surface g(x). Then the position vector of the point Q is given by:

$$\vec{r}_2 = \vec{r}_1 + h\hat{n} \tag{4}$$

Let the x component of the position vector be denoted by x. Thus, for the ISIM:

$$x = \tilde{x} - \frac{hf'(\tilde{x})}{\sqrt{1 + [f'(\tilde{x})]^2}} \quad (5a)$$

$$g(x) = f(\tilde{x}) + \frac{h}{\sqrt{1 + [f'(\tilde{x})]^2}} \quad (5b)$$

and for the ISIL:

$$x = \tilde{x} + \frac{hf'(\tilde{x})}{\sqrt{1 + [f'(\tilde{x})]^2}} \quad (6a)$$

$$g(x) = f(\tilde{x}) - \frac{h}{\sqrt{1 + [f'(\tilde{x})]^2}} \quad (6b)$$

The sum of the optical path lengths from point P to point Q, and point Q to point R is a.

Thus, for the ISIM:

$$n(h+\sqrt{x^2+(g(x)-d)^2})=a \quad (7)$$

and for the ISIL:

$$n_1 h + n_2 \sqrt{x^2+(g(x)-d)^2} = a \quad (8)$$

The expression for h in terms of x can be obtained by eliminating x from equations 5a (6a) and 5b (6b). Substituting this value of h in equation 7 gives an implicit expression for g(x). Note that for every real value of x, the presence of a real value for g(x) satisfying the implicit expression is not guaranteed in the general case.

Without going into the details of eliminating $\tilde{x}$, two special cases are provided as illustrating the principles of this invention. As mentioned above, in certain applications it is desirable to design the surface (interface) in such a way that the optical phase difference between the rays corresponding to negative $\tilde{x}$ and those corresponding to positive $\tilde{x}$, is 180°. This can be trivially achieved by generating another surface $\hat{g}(x)$ with a replaced with a+(N+½)λ, where λ is the wavelength in free-space and N is an integer. The rays corresponding to negative $\tilde{x}$ reflect (or refract) off the surface $\hat{g}(x)$ and the rays corresponding to positive $\tilde{x}$ reflect (or refract) off the surface g(x). The design should also ensure that d<$\hat{g}$(0) and d<g(0). Thus on truncating the two surfaces at the line y=d, a solid immersion lens-like effect is achieved. In the following description, the surface g(x) is derived.

Let, f(x)=c, when c is a constant. In this case, the derivative of the phase front with respect to x is zero. Equations 5(a) and 5(b) reduce to:

$$x = \tilde{x} \quad (9a)$$

$$g(x) = c + h \quad (9b)$$

and equations 6(a) and 6(b) become:

$$x = \tilde{x} \quad (10a)$$

$$g(x) = c - h \quad (10b)$$

The distance constraints, from equation 7 and equation 8 respectively become:

$$\sqrt{x^2 + (g(x)-d)^2} = \frac{a}{n} - g(x) + c \quad (11)$$

and $$\sqrt{x^2 + (g(x)-d)^2} = \frac{a - n_1(c - g(x))}{n_2} \quad (12)$$

Equation 11 can be re-written as:

$$g(x) = \frac{\left(c + \frac{a}{n}\right) + d}{2} - \frac{x^2}{2\left(\left(c + \frac{a}{n}\right) - d\right)} \quad (13)$$

This is the equation of a parabola with the focus at point R and the directrix given by y=c+a/n. This parabola has mirror symmetry about the Y axis.

Typical converging or diverging phase fronts can be assumed to be parabolic to the first order. Without loss of generality, a phase front can have the form: $f(x)=c+bx^2$. If b is positive, the phase front is converging. Otherwise, it is diverging. In this case, f'(x)=2bx. The derivation for the ISIM is indicated below. The derivation for the ISIL is similar. Equations 5(a) and 5(b) reduce to:

$$x = \tilde{x} - \frac{2hb\tilde{x}}{\sqrt{1 + 4b^2\tilde{x}^2}} \quad (14a)$$

$$g(x) = c + bx^2 + \frac{h}{\sqrt{1 + 4b^2\tilde{x}^2}} \quad (14b)$$

The above two equations can be solved to obtain expressions for $\tilde{x}$ and h. For a general b, the explicit form of g(x) has to be obtained numerically. However, for parabolic corrections to planar wavefronts, b<<1 is a good assumption. Thus, terms with quadratic and higher orders in b are neglected.

$$\tilde{x} = x[1 + 2b(g(x)-c)] \quad (15a)$$

$$h = g(x) - c - bx^2 \quad (15b)$$

Substituting the above expression for h in the distance constraint given by equation 7, gives an implicit expression for the surface g(x). Again neglecting terms that have quadratic or higher orders in b, gives:

$$g(x) = \frac{\left(c + \frac{a}{n}\right) + d}{2} - \frac{x^2}{2\left(\left(c + \frac{a}{n}\right) - d\right)} + \frac{bx^2}{2} + \frac{bx^4}{2\left(\left(c + \frac{a}{n}\right) - d\right)^2} \quad (16)$$

A comparison of equations 13 and 16 indicates that a small curvature to the wavefront gives rise to a fourth degree correction term to the parabolic surface expression.

Figure 8:
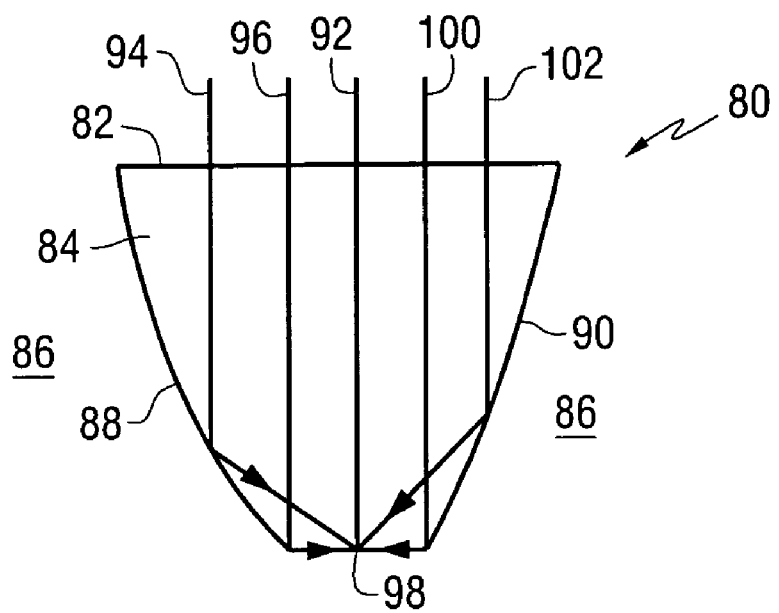
FIG. 8 is a plan view of a transducer including a solid immersion mirror in accordance with this invention.

FIG. 8 is a plan view of a transducer 80 including a solid immersion mirror 82 in accordance with this invention. The solid immersion mirror includes a waveguide 84 having a first index of refraction. The waveguide is positioned in or adjacent to another material 86 having a second index of refraction, to form interfaces 88 and 90, on opposite sides of a longitudinal axis 92. The shapes of the interfaces are chosen such that a first plurality of rays, illustrated by arrows 94 and 96 are reflected off of the first interface 88 and directed toward the focal point 98, and the second plurality of rays, illustrated by arrows 100 and 102 are reflected off of the second interface 90 and directed toward the focal point 98. The interfaces can be shaped differently, such that at the focal point, the first plurality of rays are phase shifted with respect to the second plurality of rays by 180°. Thus the interfaces are not symmetric with respect to the longitudinal axis. The electromagnetic wave (light) then includes a longitudinal electric field (normal to the medium) component that is parallel to the axis of the transducer.

Using the above equations, the interfaces can be shaped to direct the incident wave to the focal point, whether the incident wavefront is planar or non-planar. In addition, the interfaces can be shaped such that at the focal point, the wave on one side of the axis is phase shifted with respect to the wave on the other side of the axis. If the phase shift is 180°, then the electric field of the wave will have a longitudinal component that is parallel to the axis of the condenser. The solid immersion mirror of FIG. 8 can be made of a core waveguide of, for example, $Ta_2O_5$, $SiN_x$, or GaP, with a cladding outside of the core. The cladding can be, for example, $SiO_2$ or, $Al_2O_3$. Alternatively, the region outside the core waveguide could be another waveguide with a lower mode index or, a dielectric material with refractive index less than the mode index. The mirror could also be obtained by having a metal such as gold, silver, aluminum, or platinum, outside the core.

Figure 9:
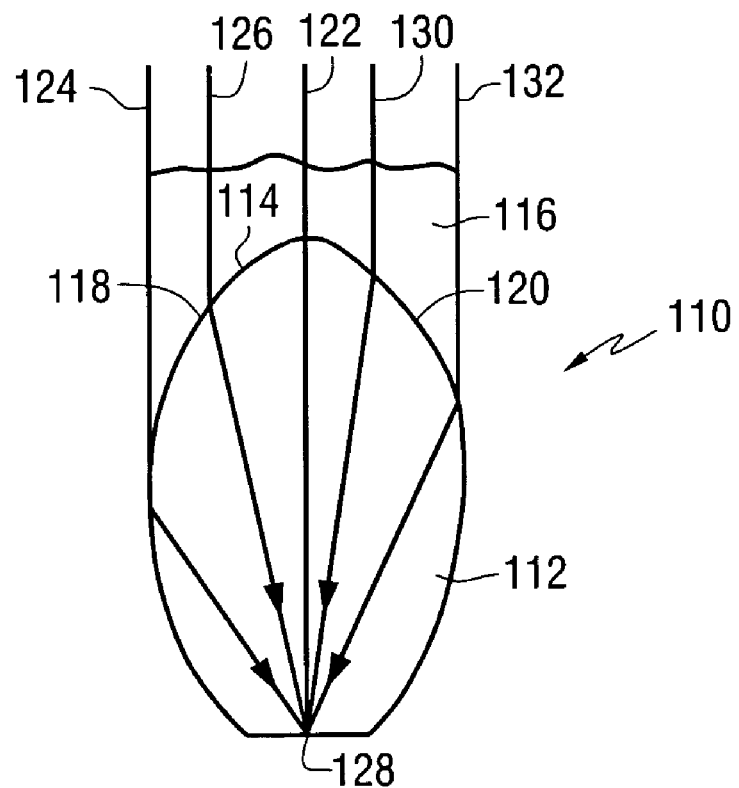
FIG. 9 is a plan view of a transducer including an integrated solid immersion lens in accordance with this invention.

FIG. 9 is a plan view of a transducer 110 including an integrated solid immersion lens 112 in accordance with this invention. The integrated solid immersion lens includes a first waveguide 114 having a first index of refraction and a second waveguide 116 having a second index of refraction, to form interfaces 118 and 120, on opposite sides of a longitudinal axis 122. The shapes of the interfaces are chosen such that a first plurality of rays, illustrated by arrows 124 and 126 are refracted at the first interface 118 and directed toward the focal point 128, and the second plurality of rays, illustrated by arrows 130 and 132 are refracted at the second interface 120 and directed toward the focal point 128. The interfaces can be shaped differently, such that at the focal point, the first plurality of rays are phase shifted with respect to the second plurality of rays by about 180°. Thus the interfaces are not symmetric with respect to the longitudinal axis. The longitudinal electric field (normal to the medium) component of the light at the focal point is then parallel to the axis of the transducer.

A metal pin can be placed at the focal point in the transducers of FIGS. 8 and 9 to further concentrate the electromagnetic energy in the incident wave.

The transducers of this invention can be used on HAMR recording devices or in other devices that require a small spot of light or other electromagnetic radiation. For example, the transducers of this invention can be used in optical lithography, near field microscopy, or in biological micro-sensors.

While this invention has been described in terms of several examples, it will be apparent to those skilled in the art that various changes can be made to the disclosed examples without departing from the scope of the invention as set forth in the following claims.

What is claimed is:

1. An apparatus comprising: a condenser for directing electromagnetic radiation to a focal point, the condenser comprising a first interface on a first side of a longitudinal axis for directing a first plurality of rays of the electromagnetic radiation to a focal point and a second interface on a second side of the longitudinal axis for directing a second plurality of rays of the electromagnetic radiation to the focal point, wherein the first and second interfaces are shaped differently from each other such that at the focal point, the second plurality of rays are about 180° out of phase with respect to the first plurality of rays.

2. The apparatus of claim 1, wherein the condenser comprises one of a solid immersion mirror or an integrated solid immersion lens.

3. The apparatus of claim 1, wherein electromagnetic radiation incident on the condenser has a planar wavefront.

4. The apparatus of claim 1, wherein electromagnetic radiation incident on the condenser has a non-planar wavefront.

5. The apparatus of claim 1, further comprising a metallic pin positioned at the focal point.

* * * * *

UNITED STATES PATENT AND TRADEMARK OFFICE
CERTIFICATE OF CORRECTION

PATENT NO. : 7,567,387 B2
APPLICATION NO. : 10/962775
DATED : July 28, 2009
INVENTOR(S) : Amit Vasant Itagi et al.

It is certified that error appears in the above-identified patent and that said Letters Patent is hereby corrected as shown below:

Detailed Description of the Invention

Column 5, Line 35
"...eliminating x from equations 5a (6a) and 5b (6b)." should read "...eliminating $\tilde{x}$ from equations 5a (6a) and 5b (6b)."

Signed and Sealed this

Twenty-fifth Day of May, 2010

David J. Kappos
*Director of the United States Patent and Trademark Office*